United States Patent
Barthelme et al.

(10) Patent No.: US 12,264,709 B2
(45) Date of Patent: Apr. 1, 2025

(54) METHOD FOR INSTALLING A BEARING ASSEMBLY ON A STATIONARY COMPONENT

(71) Applicant: AKTIEBOLAGET SKF, Gothenburg (SE)

(72) Inventors: Juergen Barthelme, Grettstadt (DE); Helmut Hauck, Euerbach (DE); Stefanie Seufert, Rothhausen (DE); Hubert Herbst, Gädheim (DE)

(73) Assignee: AKTIEBOLAGET SKF, Gothenburg (SE)

( * ) Notice: Subject to any disclaimer, the term of this patent is extended or adjusted under 35 U.S.C. 154(b) by 107 days.

(21) Appl. No.: 18/096,244

(22) Filed: Jan. 12, 2023

(65) Prior Publication Data

US 2023/0235791 A1    Jul. 27, 2023

(30) Foreign Application Priority Data

Jan. 24, 2022   (DE) .......................... 102022200758.1

(51) Int. Cl.
*F16C 35/067*   (2006.01)
*F16C 33/58*   (2006.01)
*F16C 43/04*   (2006.01)

(52) U.S. Cl.
CPC .......... *F16C 35/067* (2013.01); *F16C 33/583* (2013.01); *F16C 43/04* (2013.01)

(58) Field of Classification Search
CPC .... F16C 35/077; F16C 35/042; F16C 35/045; F16C 35/067; F16C 43/04
See application file for complete search history.

(56) References Cited

U.S. PATENT DOCUMENTS

2009/0265947 A1\* 10/2009 Sanders ................ F16C 35/062
                                                          33/645
2017/0114833 A1\* 4/2017 Herbst ..................... F16C 19/06

FOREIGN PATENT DOCUMENTS

DE         102008045092 A1 \* 3/2010   .............. F16B 2/005

OTHER PUBLICATIONS

Machine translation of DE-102008045092-A1 (Year: 2010).\*

\* cited by examiner

*Primary Examiner* — Kyle A Cook
(74) *Attorney, Agent, or Firm* — J-TEK LAW PLLC; Scott T. Wakeman; Mark A. Ussai (57) ABSTRACT

A method for installing a bearing assembly on a stationary component where the bearing assembly includes a bearing carrier, a stationary bearing ring rotationally secured to the bearing carrier and a rotatable bearing ring supported for rotation relative to the first bearing ring. The method includes inserting a portion of the bearing carrier into an opening in the stationary component or inserting a portion of the stationary component into the bearing carrier, using an alignment tool to position at least two exposed radial surface portions of the stationary bearing ring with a surface of the stationary component to produce a temporary alignment of a rotational axis of the stationary bearing ring with a central axis of the stationary component, after producing the temporary alignment, attaching the bearing carrier to the stationary component in a manner that maintains the alignment, and removing the alignment tool from the bearing ring.

7 Claims, 5 Drawing Sheets

METHOD FOR INSTALLING A BEARING ASSEMBLY ON A STATIONARY COMPONENT

CROSS-REFERENCE

This application claims priority to German patent application no. 10 2022 200 758.1 filed on Jan. 24, 2022, the contents of which are fully incorporated herein by reference.

TECHNOLOGICAL FIELD

The present disclosure is directed to a method for installing a bearing assembly on a stationary component and to a bearing assembly with a bearing carrier and an associated bearing unit for use in the installation method and to a handling tool for use in the installation method.

BACKGROUND

Rolling-element bearings can be used to support rotating components with respect to stationary components, for example as non-locating or locating bearings for supporting a rotating shaft in a housing. In this context, the bearing rings are connected to the rotating component and to the stationary component, e.g., to the housing and to the shaft, such that this connection remains fixed as constantly as possible under all operating states and environmental conditions. For attaching the stationary bearing ring to the stationary component, a bearing carrier can be used that is produced by overmolding the corresponding bearing ring. The bearing unit is then attached to the stationary component by the bearing carrier.

The bearing rings themselves are usually highly precisely manufactured, for example, by a final grinding process, and correspondingly have highly precisely manufactured contact surfaces. However, if the stationary bearing ring is now overmolded to the bearing carrier, this destroys the previous precision of the bearing ring. If the bearing unit overmolded with the bearing carrier is now mounted on a corresponding counter-contour of the stationary component, e.g., pressed in to an opening, then the positional accuracy of the stationary component with respect to the bearing assembly is significantly worse than was the case with the original high-precision contact surfaces of the stationary bearing ring and of the stationary component.

SUMMARY

It is therefore an aspect of the present disclosure to provide a method of precisely positioning a bearing assembly with respect to a stationary component despite the presence of an overmolded bearing carrier.

The bearing assembly to be installed includes a bearing carrier and a bearing unit carried by the bearing carrier. The bearing unit is configured to support a rotating component relative to a stationary component and includes a first stationary and a second rotatable bearing ring, the rotatable bearing ring being connectable to the rotating component, and the stationary bearing ring being connectable to the stationary component by the bearing carrier such that the stationary bearing ring and the stationary component are rotationally fixed.

For example, the stationary component can be, for example, a housing, in which case the stationary bearing ring is usually the outer bearing ring of the bearing unit. The rotating component can be, for example, a shaft or the like. Alternatively the stationary component can be a hub, in which case the inner bearing ring is the stationary bearing ring.

For installing the bearing assembly on the stationary component, in a first step a) the bearing assembly is inserted into the stationary component. Subsequently in a step b) the bearing assembly is centered with respect to the stationary component. This centering is effected by aligning surfaces of the stationary bearing ring and the stationary component. In contrast to previous installation methods in which surfaces of the bearing carrier were aligned with the stationary component, here surfaces of the stationary bearing ring and of the stationary component are aligned. This has the advantage that these surfaces are usually manufactured very precisely anyhow, for example by a final grinding processes in the context of the manufacturing. Due to the alignment of these (highly) precisely manufactured surfaces, a precise centering of the bearing assembly with respect to the stationary component is thus possible. After this centering, in a step c) the bearing assembly is attached to the stationary component by attaching the bearing carrier to the stationary component.

In order to enable a precise positioning and installation of the bearing assembly with respect to the stationary component, the bearing carrier of the bearing assembly used can include at least one notch cutout, which may be referred to herein as a "notch," that exposes at least one section of the stationary bearing ring. Due to this exposed section of the stationary bearing ring, one of the highly precisely manufactured surfaces of the bearing ring is usable for installation on the stationary component. In contrast to previous bearing carrier assemblies in which the highly precisely manufactured surfaces of the bearing ring were completely surrounded by the bearing carrier, in the bearing assembly used contact with a highly precisely manufactured surface of the bearing ring is still possible.

The exposed section of the stationary bearing ring is preferably provided on a radial surface of the stationary bearing, which radial surface contacts the bearing carrier. In particular, the radial surface can be an outer surface of the stationary bearing ring. This outer surface is particularly suited to serve as an alignment surface with respect to the stationary component.

Due to the use of surfaces of the stationary bearing ring and surfaces of the stationary component for the alignment and centering of the bearing assembly, it is not necessary to precisely manufacture the bearing carrier prior to such an installation. Rather, it is sufficient that the bearing unit is overmolded with a bearing carrier that has coarser tolerances compared to the outside diameter or inside diameter of the stationary bearing ring. These coarser tolerances of the bearing carrier do not have to be post-processed; instead some regions of the ground surface of the stationary bearing ring remain free from the overmolding, and can be used as aligning or centering surfaces.

The bearing carrier is advantageously non-conductive and can in particular be manufactured from plastic. Due to this non-conductive property, the bearing assembly can also be used in electric motors or similar applications that require insulation between the bearing and the stationary component. A direct contact between the bearing assembly and the stationary component is only effected via the non-conductive bearing carrier that is attached to the stationary component. The surfaces of the stationary bearing ring and of the stationary component are used only for alignment and have no direct contact with each other after the installation.

According to one embodiment, before step a), or after step a) and before step b), the method includes receiving the bearing assembly by a handling tool. Here the handling tool can be introduced in particular into the bearing assembly at an exposed surface of the stationary bearing ring at which the bearing carrier has notches. This means that the handling tool can receive the bearing assembly and then insert it into the stationary component. During the centering and attaching of the bearing assembly, the handling tool remains in the bearing assembly and is only removed afterwards.

After the insertion into the stationary component, but before the insertion of the handling tool, the bearing carrier is preferably radially movable. The bearing carrier can have an outer diameter that is smaller than the highly precise centering surface (diameter of the receiving bore) of the stationary component. It is thus ensured that the bearing carrier can be coarsely pre-centered in the receiving bore and radially moved. In this way, the handling tool can center the bearing carrier and the entire bearing assembly in the housing.

Alternatively the bearing assembly can be inserted into the stationary component, and the handling tool can be introduced into the bearing assembly after the insertion of the bearing assembly into the stationary component so that it serves only for the centering of the bearing assembly prior to the attachment of the bearing assembly. Also in this case the handling tool is removed again after attaching the bearing assembly to the stationary component.

Like the stationary bearing ring and the stationary component, the handling tool can have surfaces that can be used for aligning the surfaces of the stationary bearing ring and the stationary component. Here a first surface of the handling tool comes into contact with a surface of the stationary bearing ring, and a second surface of the handling tool comes into contact with the corresponding surface of the stationary bearing component. In this way, the surfaces of the stationary bearing ring and the stationary component are indirectly aligned by the handling tool, and the bearing assembly is thus centered with respect to the stationary component. The corresponding surfaces of the stationary bearing ring, of the handling tool. and of the stationary component are preferably highly precisely manufactured in order to enable a precise alignment.

According to a further aspect, a bearing assembly is provided for use in the installation method described above. As already explained above, the bearing assembly includes a bearing carrier and a bearing unit carried by the bearing carrier that is configured to support a rotating component relative to a stationary component. The bearing unit includes a first stationary bearing ring and a second rotatable bearing ring, the rotating bearing ring being connectable to the rotating component, and the stationary bearing ring being connectable to the stationary component by the bearing carrier such that the stationary bearing ring and the stationary component are rotationally fixed. In order to allow the installation method described above, the bearing carrier includes at least one notch that is configured to interact with a handling tool in order to be centered on the stationary component. Such a notch of the bearing carrier allows on the one hand a handling tool to engage in the bearing assembly in order to center it, and on the other hand allows access to a precisely manufactured surface of the stationary bearing ring in order to allow an alignment of the stationary bearing ring and of the stationary component.

The stationary bearing ring thus includes at least one section, exposed by the notch of the bearing carrier, that provides a precisely manufactured surface for alignment with the bearing assembly with respect to the stationary component. The bearing carrier can include a plurality of such notches that are distributed circumferentially, preferably uniformly. The notches can be configured either as blind holes, i.e., non-through openings, and/or as axially continuous holes. Alternatively the notch of the bearing carrier can be configured as a circumferential step, i.e., such that the notch extends completely circumferentially around the bearing carrier. The exposed sections of the stationary bearing ring each have corresponding configurations.

The advantages and features described above with respect to the method correspondingly apply to the proposed bearing assembly, and vice versa.

According to a further aspect, a handling tool is provided for use in the installation method as described above. The handling tool includes at least one receiving element that is configured to engage in the notch of the bearing carrier of the above-described bearing assembly. Depending on the configuration of the notch of the bearing carrier, the receiving element can be sleeve-shaped or be have several individual gripping elements that can be introduced into the notches. The receiving element can preferably include a tapered end that is introducible into the notch of the bearing carrier. The presence of such a tapered end enables a simple introduction since the tapering end has a smaller diameter than the notch itself.

Alternatively a design variant of the handling tool is realizable with adjustable centering surfaces of the at least one receiving element. Here the tool is constructed such that it can move the centering surfaces of the receiving element in the radial direction so they can be placed on the stationary bearing ring and/or on the stationary component in a completely clearance-free manner.

According to a further embodiment, the receiving element of the handling tool includes two precisely manufactured surfaces for aligning the bearing assembly relative to the stationary component. Here the first surface is configured to contact the stationary bearing ring and the second surface is configured to contact the stationary component. Due to these precisely manufactured surfaces of the receiving element of the handling tool, an indirect alignment of the stationary bearing ring is possible with respect to the stationary component.

After the installation of the bearing assembly on the stationary component, the handling tool is removed from the bearing assembly. Since there was no direct contact between the stationary bearing ring and the stationary component, but rather the alignment has only been effected by the handling tool, there is then also no direct contact between the stationary bearing ring and the stationary component. However, since the bearing carrier has been fixedly connected to the stationary component during the installation, the bearing assembly itself is connected to the stationary component such that they are rotationally fixed. Due to the lack of contact between the stationary bearing ring and the stationary component, the bearing assembly is insulated with respect to the stationary component. The only contact is effected by the non-conductive bearing carrier, as is also described above.

Another embodiment comprises a method for installing a bearing assembly on a stationary component. The bearing assembly includes a bearing carrier, a stationary bearing ring rotationally secured to the bearing carrier and having a radial surface and a rotatable bearing ring supported for rotation relative to the first bearing ring. The method includes a) inserting a portion of the bearing carrier into an opening in the stationary component or inserting a portion of the stationary component into the bearing carrier, b) using an alignment tool to position at least two exposed radial surface portions of the stationary bearing ring with a surface of the stationary component to produce a temporary alignment of a rotational axis of the stationary bearing ring with a central axis of the stationary component, c) after producing the temporary alignment, attaching the bearing carrier to the stationary component in a manner that maintains the alignment, and d) removing the alignment tool from the bearing ring.

A further embodiment comprises a method that includes providing a bearing assembly that has a bearing carrier, a stationary bearing ring overmolded to a radially outer surface of the bearing carrier and a rotatable bearing ring supported for rotation relative to the first bearing ring. The bearing carrier covers an entire radially outer surface of the stationary bearing ring except for at least two portions of the radially outer surface exposed by at least two notches in the bearing carrier. The bearing carrier also includes a radially outwardly projecting flange. The method includes inserting the outer bearing ring and a portion of the bearing carrier surrounding the stationary bearing ring into an opening in the stationary component, where the opening has an inner diameter greater than an outer diameter of the portion of the bearing carrier surrounding the stationary bearing ring. The method also includes positioning at least two spacing fingers of an alignment tool respectively into the at least two notches and into the opening such that a first side of each of the at least two spacing fingers contacts the radially outer surface and a second side of each of the at least two spacing fingers contacts a radially inner surface of the opening. After the positioning fasteners can be inserted in the plurality of openings to fix the flange relative to the stationary component, and the alignment tool can be removed.

The advantages and features described above with respect to the method and the bearing assembly correspondingly apply to the proposed handling tool, and vice versa.

Further advantages and advantageous embodiments are specified in the description, the drawings, and the claims. Here in particular the combinations of features specified in the description and in the drawings are purely exemplary so that the features can also be present individually or combined in other ways.

In the following the disclosure is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
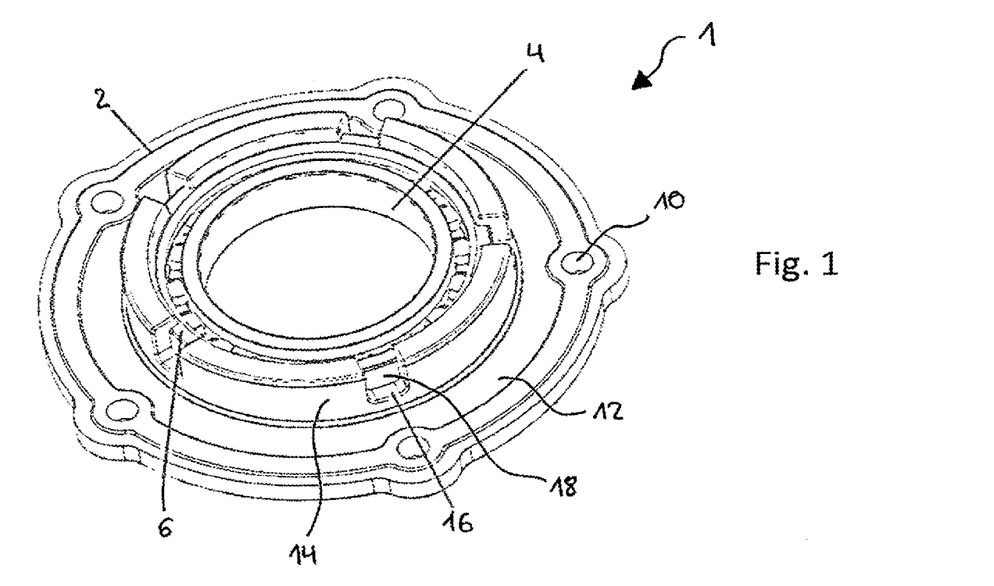
FIG. 1 is a perspective view of a bearing assembly with a bearing carrier according to an embodiment of the present disclosure.

FIG. 1 shows a bearing assembly 1 with a bearing carrier 2 in which a bearing unit is disposed which bearing unit includes an inner ring 4 and an outer ring 6. The exemplary embodiments depicted show a bearing assembly 1 that can be used, for example, for supporting a shaft in a housing, where the housing is stationary and the shaft is rotating. Of course, the bearing assembly 1 is also usable in other applications, for example, with a stationary bolt and a rotating housing.

The inner ring 4 is configured as a rotatable bearing ring, and the outer ring 6 is configured as a stationary bearing ring and is connected to the bearing carrier 2. Between the bearing rings 4, 6, rolling elements 8 are disposed, as can be seen in particular in FIG. 2. In the exemplary embodiment depicted, the bearing unit is configured as a ball bearing, but all other types of rolling-element bearings, such as, for example, roller bearings, or plain bearings, are also possible.

For attachment to the housing (32 in FIGS. 4a-4g), the bearing carrier 2 includes receptacles, in this case through-openings 10, into which attachment means, e.g., threaded fasteners such as screws, can be introduced. Other receptacles are also possible, such as, for example, threaded necks or separate inserts.

Figure 2:
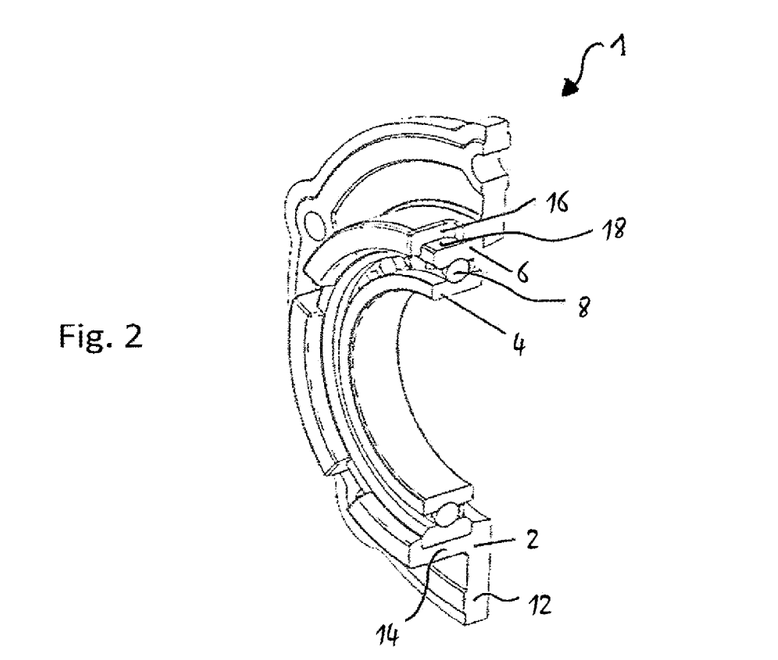
FIG. 2 is a perspective sectional view of the bearing assembly of FIG. 1.

In the exemplary embodiments depicted, the bearing carrier 2 includes a flange 12 including the receptacles 10 and a shoulder 14 in the center of which the bearing unit is disposed.

In the region of the shoulder 14, the bearing carrier 2 includes cutouts or notches 16. These notches 16 cause the sections 18 of the bearing outer ring 6 to be exposed. During the installation of the bearing assembly 1 into the stationary component, e.g., the housing, these sections 18 can be used in order to access the highly precisely manufactured surface of the outer ring 6 and to thus allow a precise alignment of the bearing assembly 1 with respect to the stationary component.

Figure 3:
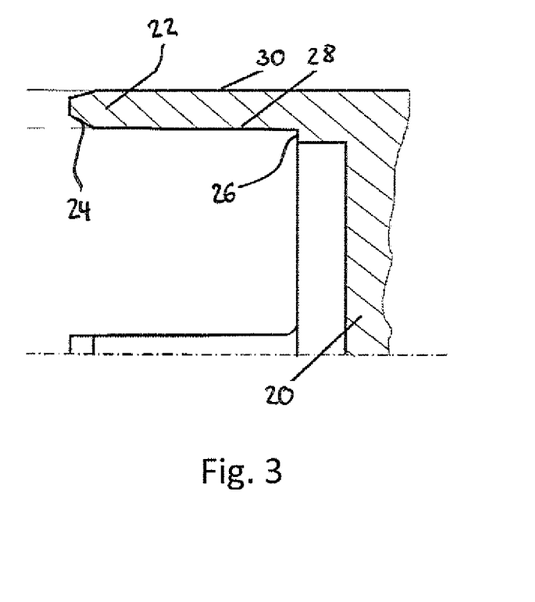
FIG. 3 is a sectional view of a handling tool for installing the bearing assembly of FIGS. 1 and 2 in a stationary component.

A handling tool 20 that can be used to install the bearing assembly 1 on a stationary component 32 is now described with reference to FIG. 3. The handling tool 20 includes one or more receiving elements 22 which may be provided in the form of fingers. These receiving elements 22 are introduced into the corresponding notches 16 of the bearing carrier 2. In order to simplify the introduction of the receiving elements 22, they can have tapered ends 24. If the handling tool 20 is introduced into the notches 16 of the bearing carrier 2, an abutment surface 26 of the handling tool 20 abuts against an end surface of the stationary bearing ring 6. The receiving element 22 includes centering surfaces 28, 30. As is described in the following with reference to the installation method, these centering surfaces 28, 30 serve to center the outer ring 6 with respect to the stationary component, hereinafter referred to as the housing.

The installation method is now described with reference to FIGS. 4a to 4g.

Figure 4A:
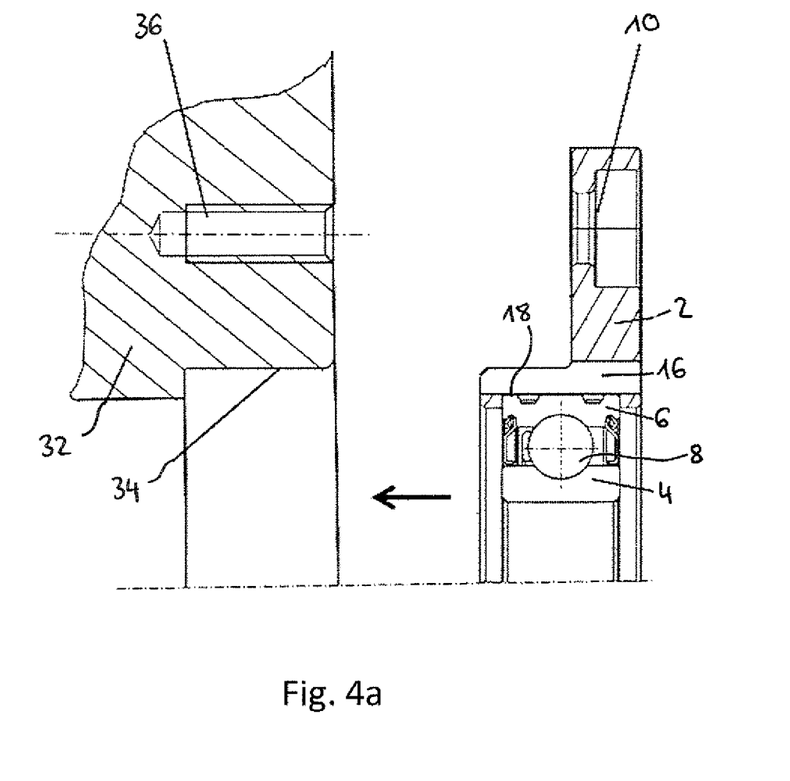
FIGS. 4a-4g are sectional views of the bearing assembly and the handling tool of the FIGS. 1 to 3 during the installation process.

In a first step, in FIG. 4a the bearing assembly 1 is introduced into the stationary component 32. The stationary component 32 includes a centering surface 34 that is to be aligned with a surface 18 of the outer ring 6. The surface 18 of the outer ring 6 is exposed by the notch 16 of the bearing carrier 2. The stationary component 32, referred to below as a housing, includes a receptacle 36 that is connected by an attachment means to the bearing carrier 2 or its receptacle 10 after the installation.

Figure 4B:
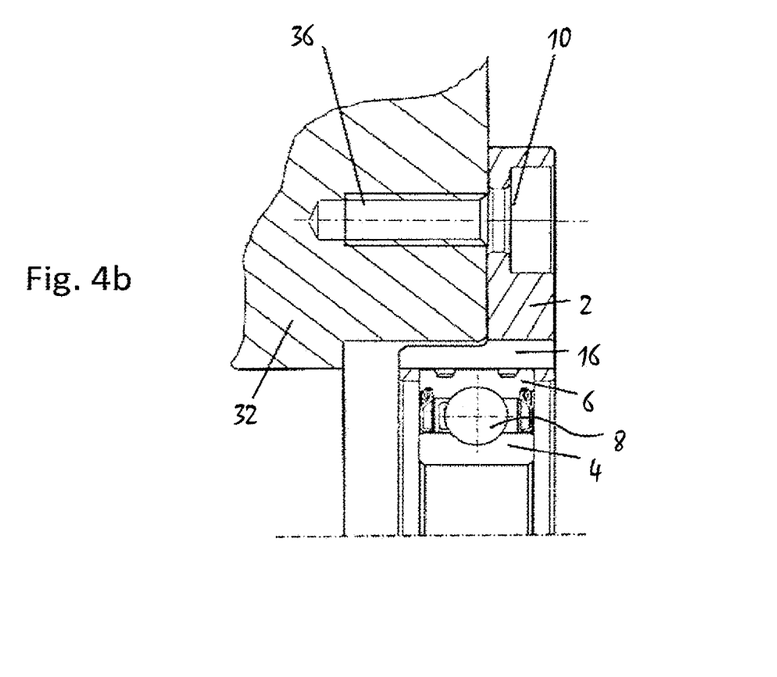

After inserting the bearing assembly 1 into the housing 32, as is shown in FIG. 4b, the receptacles 10 and 36 of the bearing carrier 2 and of the housing 32 are already roughly aligned. However, there is still a small clearance between the radially outer surface of the shoulder 14 and the centering surface 34. The attachment means 26 can secure the flange 14 to the stationary component as long as the shoulder is located in the housing 32 even if the bearing outer ring 6 is not precisely centered relative to the centering surface 34. That is, the attachment means 26 alone cannot precisely determine the location of the shoulder 14 relative to the centering surface 34. The precise alignment and centering is therefore effected with the aid of a handling tool 20, as is already described above.

Figure 4C:
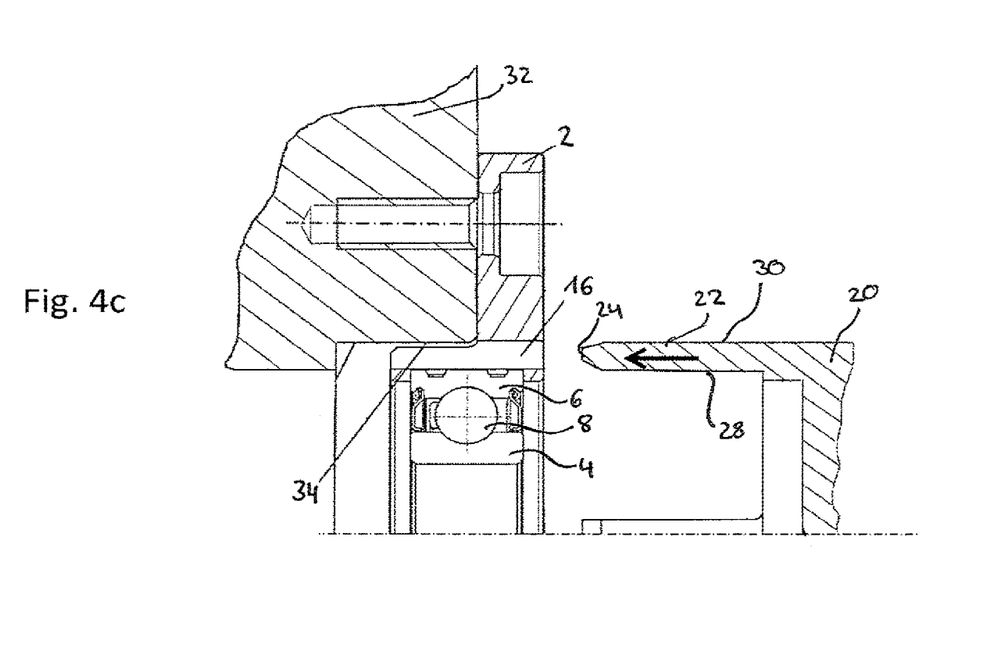
Figure 4D:
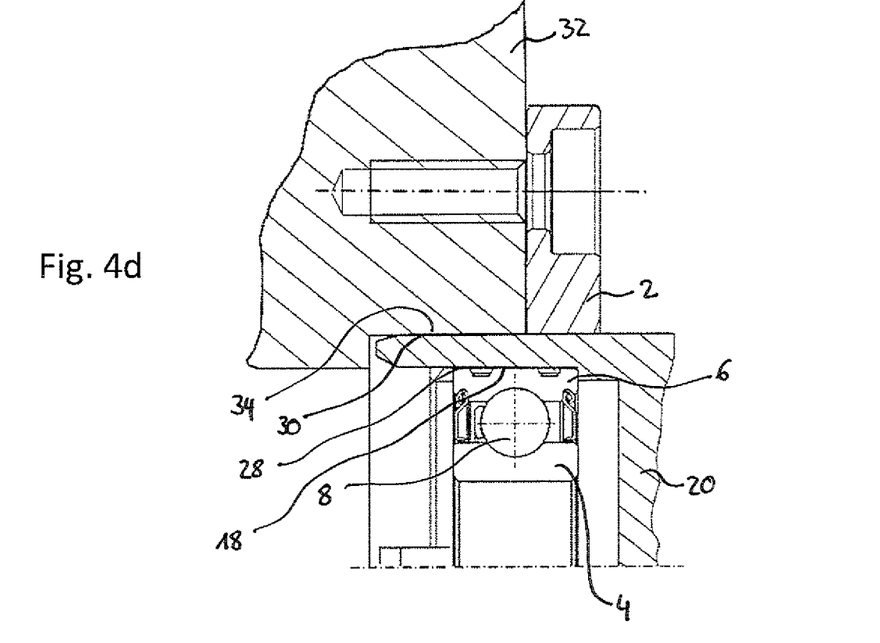

As is shown in FIG. 4c, the tapered end 24 of the handling tool 20 is inserted into the notch 16 of the bearing carrier 2. After inserting the handling tool 20 into the bearing assembly 1 (FIG. 4d), the surface 18 of the outer ring 6 is aligned with the centering surface 28 of the handling tool 20, and the centering surface 30 of the handling tool 20 is aligned with the surface 34 of the housing 32. Each of these surfaces is highly precisely manufactured in order to make possible an alignment and thus centering of the bearing assembly 1 with respect to the housing 32. In this way, the surface 18 of the outer ring 6 and the surface of the housing 32 are also aligned with each other.

Figure 4E:
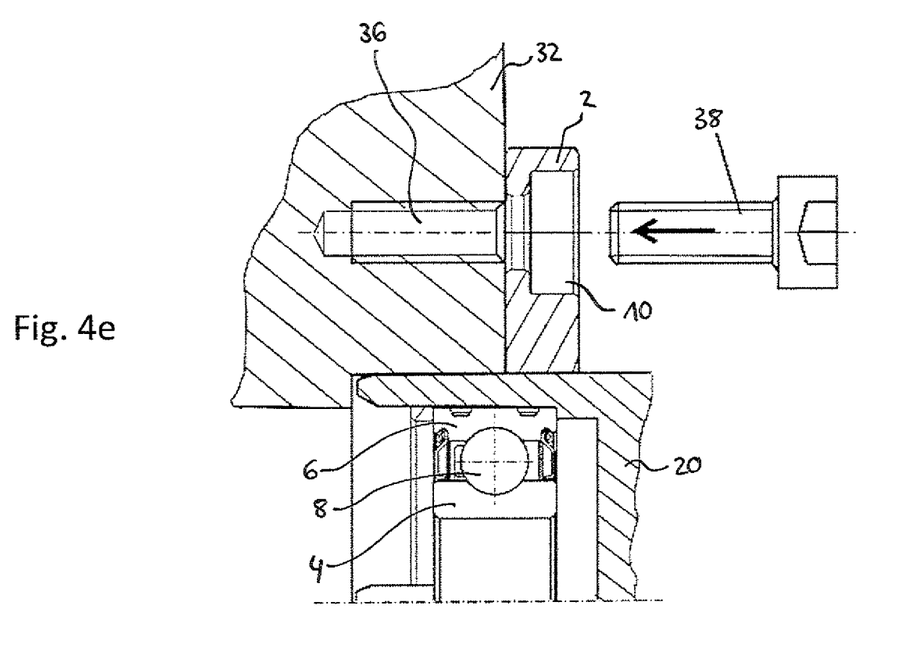
Figure 4F:
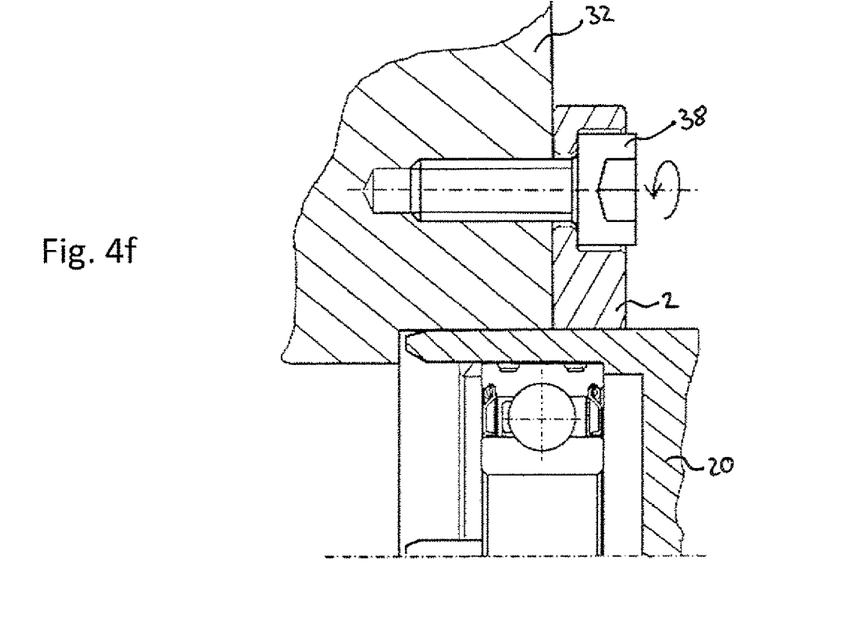
Figure 4G:
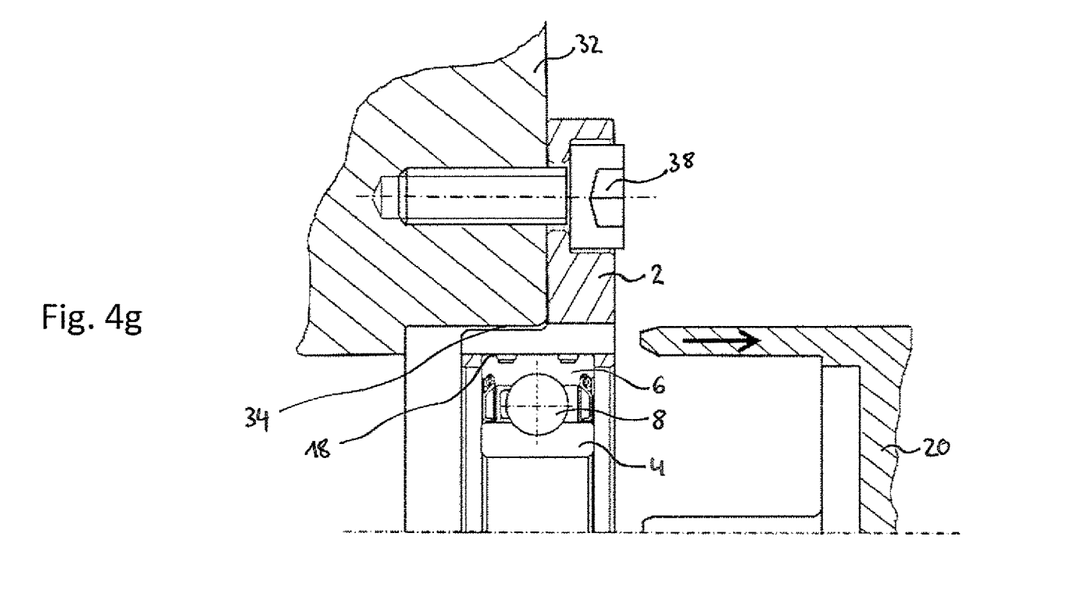

After this centering, as shown in FIGS. 4e and 4f, an attachment means 38 is first introduced into the receptacles 10 and 36 and subsequently screwed tight. Once the bearing assembly 1 is connected by the attachment means 38 to the housing 32 such that the bearing assembly 1 and the housing 32 are rotationally fixed, the handling tool 20 can be removed again as is shown in FIG. 4g. The surface 34 of the housing 32 and the surface 18 of the outer ring 6 are now no longer in direct contact, whereby an insulation between bearing assembly 1 and housing 32 via the bearing carrier 2 is possible. The direct contact between the bearing assembly 1 and the housing 32 is only effected by the non-conductive bearing carrier 2. However, since the bearing assembly 1 has been precisely aligned with the housing 32 by the handling tool 20, and the bearing carrier 2 has been connected to the housing 32 in this centered position, this precise alignment and positioning remains even after the removal of the handling tool 20.

Alternatively to the order depicted in FIGS. 4a-4c, it is also possible (not depicted here) to first introduce the handling tool 20 by the tapering end 24 into the notch 16 of the bearing carrier 2. In a second step, the handling tool 20 together with the bearing carrier 2 would then be introduced into the receptacle of the housing 32, so that now the centering surface 30 of the receiving element 22 also comes into contact with the centering surface 34 of the housing 32, whereby the already-described precise positioning between the outer ring 6 and housing 32 results. The further steps are now analogous again to those of FIGS. 4d-4g.

Due to the bearing assembly described here and the corresponding installation method, it is thus possible to provide a precise positioning of the bearing assembly with respect to the housing without a precise manufacturing and post-processing of the bearing carrier 2 being necessary. Instead, the surfaces, already precisely manufactured anyhow, of the housing and of the outer ring, are used.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved methods and tools for installing a bearing assembly on a stationary component.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing assembly
2 Bearing carrier
4 Inner ring
6 Outer ring
8 Rolling element
10 Receptacles
12 Flange
14 Shoulder
16 Notches
18 Exposed sections
20 Handling tool
22 Receiving element
24 Tapered end
26 Abutment surface
28 Centering surface
30 Centering surface
32 Housing
34 Centering surface
36 Receptacle
38 Attachment means

What is claimed is:

1. A method for installing a bearing assembly on a stationary component, the bearing assembly including a bearing carrier, a stationary bearing ring rotationally secured to the bearing carrier and having a radial surface and a rotatable bearing ring supported for rotation relative to the stationary bearing ring, the method comprising:
   a) inserting a portion of the bearing carrier into an opening in the stationary component or inserting a portion of the stationary component into the bearing carrier,
   b) using an alignment tool to position at least two exposed radial surface portions of the stationary bearing ring with a surface of the stationary component to produce a temporary alignment of a rotational axis of the stationary bearing ring with a central axis of the stationary component,
   c) after producing the temporary alignment, attaching the bearing carrier to the stationary component in a manner that maintains the alignment, and d) removing the alignment tool from the stationary bearing ring.

2. The method according to claim 1,
including placing the alignment tool on the at least two exposed radial surface portions of the stationary bearing ring before step a.

3. The method according to claim 1,
wherein the alignment tool is configured to contact the at least two exposed radial surface portions of the stationary bearing ring and the surface of the stationary component.

4. The method according to claim 1,
wherein the bearing carrier is overmolded to the stationary bearing ring.

5. The method according to claim 1,
wherein the radial surface of the stationary bearing ring is a radially outer surface of the stationary bearing ring,
wherein the bearing carrier is overmolded to the radially outer surface of the stationary bearing ring and covers the entire radially outer surface of the stationary bearing ring except for the at least two exposed radial surface portions,
wherein the bearing carrier includes a flange projecting radially outwardly of the radially outer surface, the flange including a plurality of axial openings, and
wherein the attaching comprises inserting a fastener through each of the plurality of openings in the flange to secure the flange to the stationary component.

6. A method comprising:
providing a bearing assembly comprising:
 a bearing carrier, a stationary bearing ring rotationally fixed to the bearing carrier and a rotatable bearing ring supported for rotation relative to the stationary bearing ring,
 wherein the bearing carrier covers an entire radially outer surface of the stationary bearing ring except for at least two portions of the radially outer surface exposed by at least two cutouts in the bearing carrier,
 wherein the bearing carrier is overmolded to the radially outer surface of the stationary bearing ring, and
 wherein the bearing carrier includes a flange projecting radially outwardly of the radially outer surface, the flange including a plurality of axial openings each configured to receive a fastener to fasten the flange to a stationary component,
inserting the stationary bearing ring and a portion of the bearing carrier surrounding the stationary bearing ring into an opening in the stationary component, the opening having an inner diameter greater than an outer diameter of the portion of the bearing carrier surrounding the stationary bearing ring, and
positioning at least two spacing fingers of an alignment tool respectively into the at least two cutouts and into the opening such that a first side of each of the at least two spacing fingers contacts the radially outer surface and a second side of each of the at least two spacing fingers contacts a radially inner surface of the opening.

7. The method according to claim 6, including
after the positioning, inserting the fasteners in the plurality of openings to fix the flange relative to the stationary component, and
removing the alignment tool from the opening.

\* \* \* \* \*